United States Patent Office.

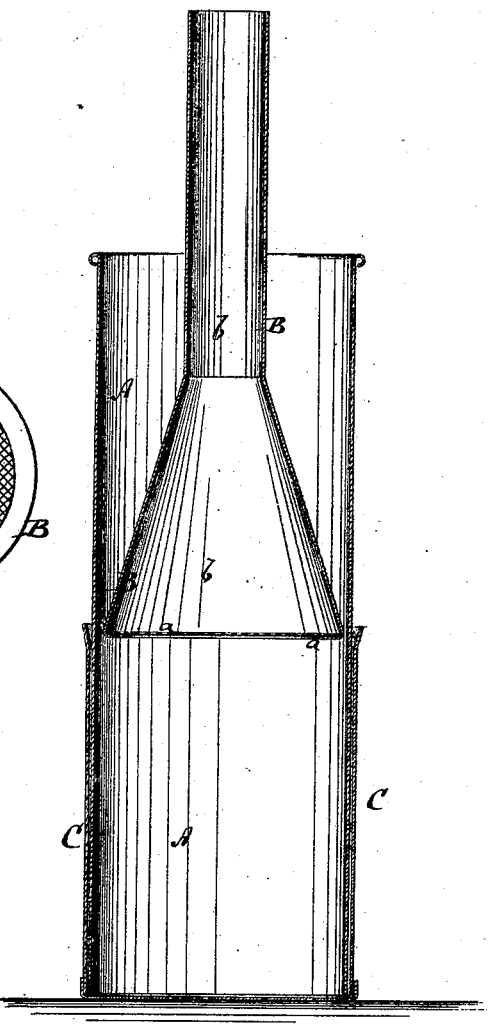

CHRISTOPHER T. PROVOST, OF NEW YORK, N. Y.

Letters Patent No. 103,927, dated June 7, 1870.

IMPROVEMENT IN APPARATUS FOR PACKING PRESERVES.

The Schedule referred to in these Letters Patent and making part of the same.

To all whom it may concern:

Be it known that I, CHRISTOPHER T. PROVOST, of the city, county, and State of New York, have invented a new and Improved Apparatus for Packing Preserves, &c.; and I do hereby declare that the following is a full, clear, and exact description thereof, which will enable others skilled in the art to make and use the same, reference being had to the accompanying drawing forming part of this specification.

Figure 1 represents a sectional elevation of my improved preserve-packing apparatus.

Figure 2 is an inverted end view of the perforated presser.

Similar letters of reference indicate corresponding parts.

The object of this invention is to facilitate the packing of tomatoes and other vegetables or fruit in the preserve-cans.

At present vegetables are packed so loosely that, in many cases, the value of the can exceeds by far that of its contents.

By means of my invention the cans can be thoroughly and closely packed, and the useless water removed without improperly mashing the fruit or vegetables to be preserved.

My invention consists in the use of a tube, A, and hollow presser, B.

The tube A is about twice as long as the can, C, to be packed, and of such diameter as to fit snugly into the can.

The presser B consists of a sieve, $a$, which is secured to the enlarged lower end of a tubular shank, $b$, the sieve being of such size as to fit snugly into the tube A.

The operation is as follows:

The tube A is fitted into the can, and is then filled with the vegetables or fruit to be preserved. The presser is then, with the broad end, inserted in the tube, and gently forced down so as to compress the fruit, while the water can enter the presser.

When the contents of the tube have been compressed to the height of the can, the whole apparatus is turned, so as to let the water or liquor flow out through the upper end of the shank $b$.

The presser is now removed and the tube A withdrawn, the compressed matter remaining in the can ready for preservation. In this manner the cans can be quickly and properly packed without the unnecessary loss of space occasioned by the present method of packing.

Having thus described my invention,

I claim as new and desire to secure by Letters Patent—

1. The presser B, consisting of the hollow shank $b$ and perforated bottom $a$, substantially as herein set forth and described.

2. The combination of the presser B and sieve $a$ with the tube A, all arranged for packing and compressing fruits, vegetables, &c., as set forth.

CHRISTOPHER T. PROVOST.

Witnesses:
A. W. BRIESEN,
GEO. W. MABEE,